United States Patent [19]
Grassi

[11] 3,913,188
[45] Oct. 21, 1975

[54] PIPE CLAMP

[76] Inventor: Arturo Grassi, 2553 Drew Road, Mississauga, Ontario, Canada

[22] Filed: Nov. 20, 1974

[21] Appl. No.: 525,473

[52] U.S. Cl. ................................. 24/276; 29/279
[51] Int. Cl.² .............................................. B65D 63/00
[58] Field of Search ........................... 24/275–286

[56] References Cited
UNITED STATES PATENTS

| | | | |
|---|---|---|---|
| 534,934 | 2/1895 | Wells | 24/279 UX |
| 1,145,292 | 7/1915 | Buck | 24/276 UX |
| 1,165,464 | 12/1915 | Stuckel | 24/276 |
| 1,214,308 | 1/1917 | Inglis | 24/276 |
| 1,278,598 | 9/1918 | Cooper | 24/279 |
| 2,093,210 | 9/1937 | Powell | 24/276 |
| 3,633,254 | 1/1972 | Hoglund et al. | 24/276 |

*Primary Examiner*—Donald A. Griffin

[57] ABSTRACT

A pipe clamp is formed of two arcuate wire clamping members, hingedly interengaged at their one ends and overlapping at their other ends, with a screw actuated strainer arrangement acting between said other ends of the wire clamping members so as to provide the necessary clamping action. Bent end portions of the clamping members are coined so as to assure better clamping action on a pipe being clamped.

2 Claims, 3 Drawing Figures

PIPE CLAMP

FIELD OF THE INVENTION

The field of the invention is pipe clamps, and more especially heavy duty clamps such as those used for interconnecting automotive exhaust systems. In such systems, it is important that clamps be used that can exert pressure on the pipes being clamped around the full circumference of the pipes in order to ensure gas tight connections.

BRIEF DESCRIPTION OF THE PRIOR ART

Numerous designs of heavy duty clamp for the above purpose are known. In general these comprise an arcuate wire clamping member surrounding a greater or lesser portion of the periphery of a pipe being clamped, and a pressed steel clamping member having arcuate surfaces engaging the remainder of the periphery of the pipe as well as appropriate abutments for engaging the ends of the wire member, either by means of nuts threaded onto the ends of the wire member, or a nut on one end and a suitable hook formation at the other end of the wire member. A problem with this type of clamp is that the pressed steel clamping member is necessarily substantially rigid, and therefore the arcuate surfaces formed on it to engage the pipe cannot accommodate themselves to variations in pipe diameter or irregularities in pipe configuration, thus often producing a less than perfect seal. For some purposes, pipe clamps have been used in which a wire clamping member substantially surrounds the pipe, but in heavy duty clamps this is not a satisfactory arrangement because the clamping member must be sprung open to enable it to be positioned over the pipe, and with heavy gauges of wire this would tend to cause distortion of the loop which would not be taken up on subsequent tightening of the clamp, thus again leading to an imperfect sealing action.

SUMMARY OF THE INVENTION

According to the invention, a pipe clamp is formed of two generally arcuate wire clamping members hingedly interengaged at their one ends and overlappable at their other ends to form a closed loop embracing a pipe to be clamped, screw actuated strainer means being provided acting between the overlapping ends of the clamp members. Preferably one of the clamp members is formed by a single wire having a terminal loop at one end, and the other clamping member by two parallel wires joined at one end by a terminal loop, the hinge connection between the clamping members being provided by interengagement of the terminal loops. The straining means may comprise a bracket engaged at one end by out-turned portions of the free ends of the wires forming the two wire clamping member and at its other end by a nut engaging a thread on the free end of the single wire clamping member. In order to improve the clamping action, the wire of the clamping members may be coined at the ends of the arcuate portions, in order to increase its extent towards the axis of the clamp. The arrangement of the invention provides a pipe clamp which can readily be fitted to a pipe to be clamped without distortion of the parts, but at the same time enables the pipe to be gripped around its entire periphery by wire clamping members which can accommodate themselves to variations in diameter and configuration of pipes being clamped and thus ensure a good seal. The coining of the wire further ensures that proper clamping engagement with the pipe is maintained throughout the extent of the arcuate portions of the clamping members.

SHORT DESCRIPTION OF THE DRAWINGS

A preferred embodiment of the invention is illustrated in the accompanying drawings, in which.

DESCRIPTION OF THE PREFERRED EMBODIMENT

Figure 1:
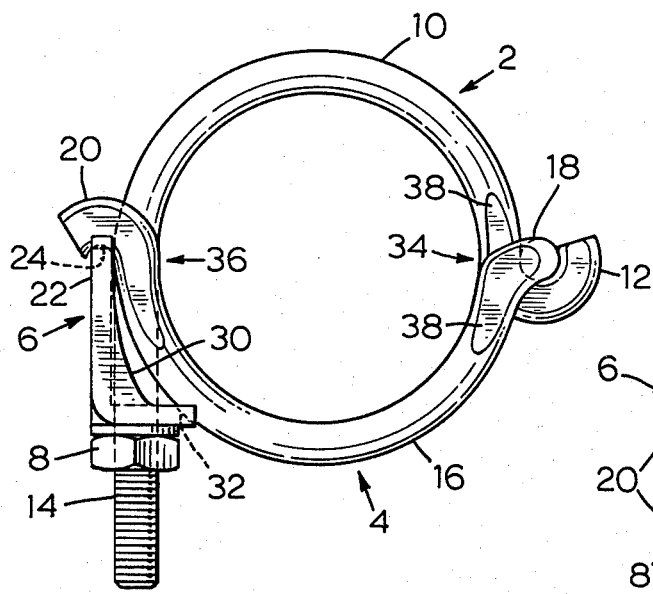
FIG. 1 is an axial view of a clamp in accordance with the invention.

The clamp shown in the drawings comprises four parts, a first clamping member or U-bolt 2, a second clamping member or saddle 4, a strainer 6 and a nut 8.

The first clamping member 2 consists of a length of wire formed into a semicircular arc portion 10, the wire at one end of the arc portion being out-turned and reverse bent into a loop 12, while the other end of the wire extends tangentially to the arc of the portion 10 to a terminal threaded portion 14.

Figure 2:
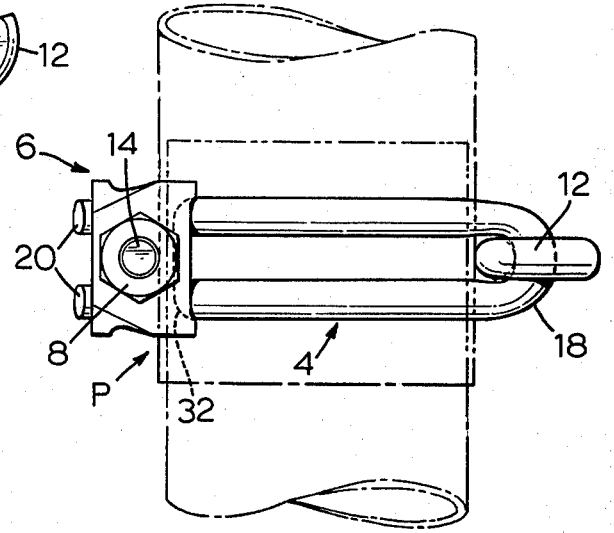
FIG. 2 is a plan view of the clamp showing it in use to clamp the ends of two telescopically engaged pipes.

The second clamp member 4 is again formed by a length of wire, in this case bent double so that, as seen in plan (see FIG. 2) it is of U-shape. The wire is further bent, as best seen in FIG. 1, so as to provide a semicircular arcuate portion 16, the bight portion of the U-shape being out-turned relative to the portion 16 so as to form a terminal loop 18. The free ends of the wire are also reverse bent to form out-turned portions 20, and as shown in FIGS. 1 and 2, the terminal loop 18 is received in the terminal loop 12 to form a hinge connection between the two clamping members so that they can be closed around a pipe P to the position shown in FIGS. 1 and 2 with the threaded end portion 14 of the first clamping member overlapping and passing between the out-turned end portions 20 of the second clamping member 4.

The strainer 6 is a pressed steel bracket basically of L-shape, one limb 22 of the L being formed with a recess 24 which engages the out-turned portions 20 of the second clamping member. The threaded portion 14 of the first clamping member passes through a bore 28 in the other limb 26 of the L, which provides a seating for the nut 8 which is threaded onto the portion 14. The strainer is formed with reinforcing ribs 30 to prevent distortion.

In order to tighten the clamp after the clamping members have been closed around a pipe to be clamped, the strainer 6 is positioned with its limb 22 engaging the out-turned portions 20 of the second clamping member 4, and with a notch 32 in its limb 26 engaging the portion 16 of this same clamping member, and the nut 8 is tightened so as to draw the clamping members into clamping engagement with a pipe P. Since both clamping members are formed from wire, they can readily accommodate themselves to minor variations in pipe diameter and to deviations of the pipe from circularity.

In order still further to improve the clamping action, those portions of the clamping members adjacent their points of overlap 34 and 36 (see FIG. 1) may be subjected to a coining operation at locations 38 (see FIGS.

Figure 3:
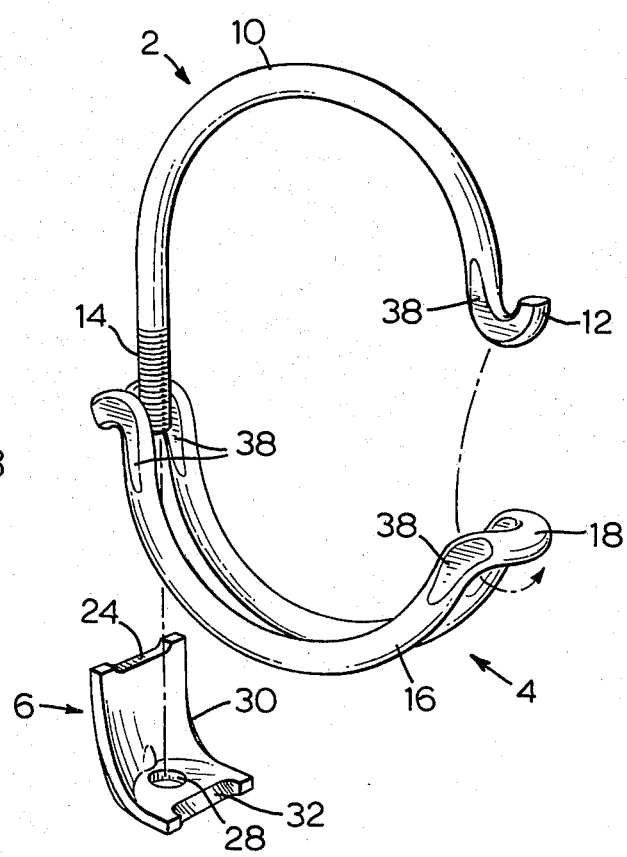
FIG. 3 is an exploded perspective view of the clamp showing its various parts.

1 and 3) so as to extend their width towards the axis of the clamp. This compensates for the local decrease of clamping pressure which might otherwise occur at these points due to imperfect transitions between the different bends applied to the wire in forming the clamping members. It also avoids the formation of discontinuities in the periphery of the clamp of the points 34, 36, into which discontinuities the metal of the pipe being clamped might be distorted, so causing an imperfect seal. The broadening of the wire produced by the coining can be seen in the regions 34 and 36 in FIG. 1, and adjacent the locations 38 in FIG. 3. The coined portions 38 of the clamping members are not shown in FIG. 2.

The clamp described provides an excellent clamping performance which is maintained even in the presence of variations of pipe diameter and deviations from circularity. At the same time, since the clamping members are formed solely from wire by simple forming operations, and the only pressed steel component is small and not critical in its dimensions, manufacturing costs are low. The clamp is easy to install without any danger of the parts being strained during installation.

What I claim is:

1. A pipe clamp having a first clamp member comprising a length of wire formed substantially into a semicircle, the wire having a reverse bend at one end forming a loop and having at its other end a straight threaded portion, a second clamp member comprising a further length of wire formed into a narrow U-shape in one plane and formed, in a second plane at right angles to the first plane, substantially as a semicircle with reverse bent end portions at the free ends and bight respectively of the U-shape, the semicircle being of the same radius as that formed by the clamp member, said reverse bent bight of the second clamp member passing through the loop formed at said one end of the first clamp member, a nut on the threaded portion of the first clamp member, and a locating member engagable with said nut and with the reverse bent free ends of the wire forming the second clamp member when said threaded portion is situated between said free ends.

2. A pipe clamp according to claim 1 wherein those portions of the wires forming the clamp members adjacent the points of intersection of the semicircles formed by said clamp members are coined to increase their extent towards the axis of the clamp.

* * * * *